United States Patent [19]

Eimen

[11] 4,222,555
[45] Sep. 16, 1980

[54] HYDRAULIC CUSHIONING DEVICE FOR VEHICLE SEAT

[75] Inventor: Shawn H. Eimen, Milwaukee, Wis.

[73] Assignee: Milsco Manufacturing Company, Milwaukee, Wis.

[21] Appl. No.: 6,584

[22] Filed: Jan. 26, 1979

[51] Int. Cl.[2] .......................... A47C 7/14; F16F 9/16
[52] U.S. Cl. ..................... 267/131; 248/550; 267/117; 267/DIG. 1; 267/126; 91/390
[58] Field of Search ............ 267/65 D, 120, 124, 267/117, 131, DIG. 1, DIG. 2; 248/550, 567; 188/283

[56] References Cited

U.S. PATENT DOCUMENTS

| | | | |
|---|---|---|---|
| 3,300,203 | 1/1967 | Carter et al. | 267/117 |
| 3,807,717 | 4/1974 | Ito | 267/DIG. 1 |
| 3,810,611 | 5/1974 | Ito et al. | 267/DIG. 1 |
| 3,938,770 | 2/1976 | Turner et al. | 248/550 |

FOREIGN PATENT DOCUMENTS 1264977 3/1968 Fed. Rep. of Germany .... 267/DIG. 1
2301482 8/1973 Fed. Rep. of Germany .... 267/DIG. 1

*Primary Examiner*—Edward R. Kazenske
*Attorney, Agent, or Firm*—James E. Nilles

[57] ABSTRACT

A hydraulic seat cushioning device comprising a cylinder body and a piston has a concentric post-like upward projection in the cylinder body with a cylindrical surface in which there are a pressure fluid port and a vent port. An annular valving element closely slidably surrounding the post-like portion covers those ports when in a normal position but uncovers the vent port when above that position and uncovers the pressure fluid port when below it. The piston is so connected with the valving element as to move independently thereof in a lower portion of its stroke, but through the remainder of the piston stroke the valving element is constrained to move with the piston.

5 Claims, 7 Drawing Figures

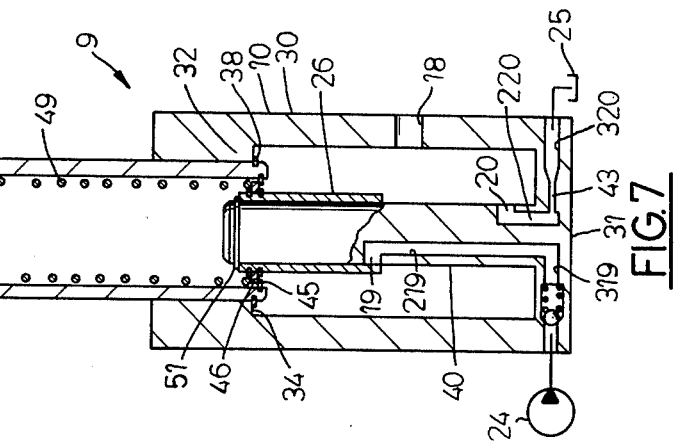
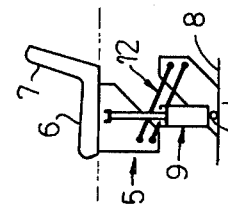
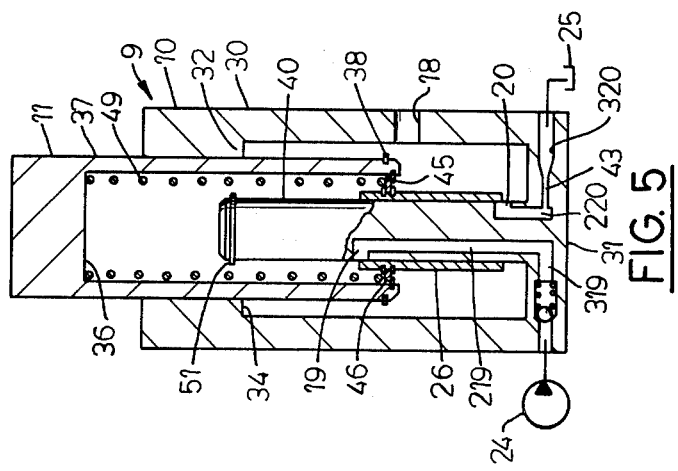
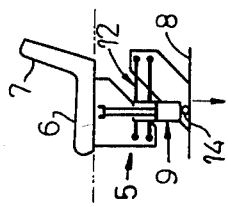
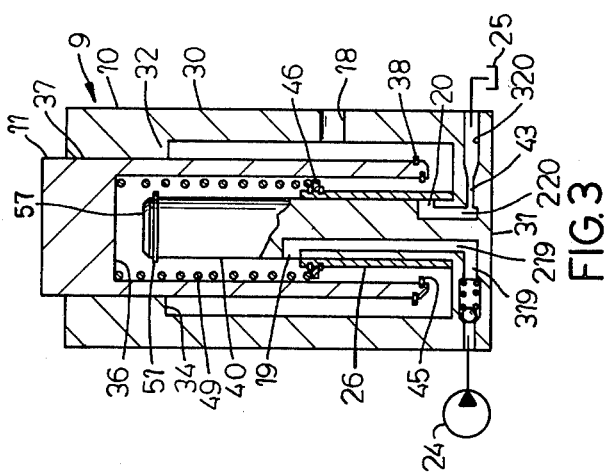
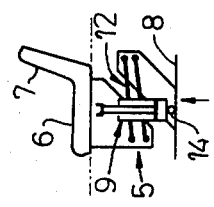

HYDRAULIC CUSHIONING DEVICE FOR VEHICLE SEAT

FIELD OF THE INVENTION

This invention relates to a cushioning suspension device for the seat of an off-highway vehicle such as a tractor or a bulldozer, and the invention is more particularly concerned with an improved hydraulic seat suspension and shock absorbing device of the general type disclosed in my copending application, Ser. No. 963,376, filed Nov. 24, 1978.

BACKGROUND OF THE INVENTION

A tractor, bulldozer or similar off-highway vehicle has an unsprung chassis, and therefore the operator of such a vehicle would be subjected to severe jolting and shaking if the vehicle seat were not supported on the chassis by means of a resilient shock absorbing suspension. Among the cushioning devices heretofore proposed for resilient seat support are those comprising metal springs, such as disclosed in U.S. Pat. Nos. 2,840,140 and 3,787,025, and those comprising air springs, such as disclosed in U.S. Pat. Nos. 3,913,975 and 3,994,469.

A resilient seat suspension must permit the seat to have a certain amount of up and down motion with respect to the vehicle chassis in order to afford the necessary cushioning action. It is also necessary that a seat suspension provide for heightwise adjustability of the seat irrespective of the weight of its occupant, having in mind that a heavy occupant, who tends to depress a resiliently supported seat to a height lower than average, may be a short person for whom the seat should be higher than average. With some of the earlier seat suspension devices, heightwise seat adjustment was not independent of the weight of the occupant, and with others height adjustment involved complicated mechanism or afforded less comfortable riding qualities for seat occupants of certain height/weight ratios than for others.

My copending application Ser. No. 963,376, filed Nov. 24, 1978, discloses a seat suspension arrangement which avoids these problems and disadvantages. The seat suspension of that application comprises a hydraulic cushioning device which is interposed between the seat proper and a chassis member and which comprises a piston that is slidable in a cylinder body both upward and downward from a normal position that it tends to maintain regardless of the weight of the seat occupant. The interior of the cylinder body is at all times communicated through a throttling restriction with a hydraulic accumulator, and therefore the piston can have yielding up and down motion out of its normal position in response to bumps and the like. However, fluid can also flow into and out of the interior of the cylinder body through a pressure fluid port and a vent port, both of which are blocked by a valving portion of the piston when the piston is in its normal position.

The pressure fluid port is connected with a source of hydraulic fluid under substantially constant pressure. By way of the vent port, fluid can leave the interior of the cylinder body through a throttling restriction. If the piston is forced down from its normal position, its valving portion uncovers the pressure fluid port, and hydraulic fluid from the constant pressure source enters the cylinder body, forcing the piston back up to its normal position and increasing the charge on the accumulator to such an extent that the piston tends to be maintained in that position. If the piston rises above its normal position, the valving portion uncovers the vent port, and drainage of fluid out of the cylinder body permits the piston to return to its normal position and effects such partial discharge of the accumulator as tends to maintain it there.

Because the piston always seeks its normal position relative to the cylinder, provision for heightwise adjustment of the seat is external to the cushioning device. Thus, the chassis member on which the device is mounted can be adjustable up and down, or the connection between the seat and the device can be heightwise adjustable.

In a preferred form of the hydraulic cushioning device as disclosed in that application, the cylinder body has a bottom wall, a side wall that projects up from the bottom wall, and a coaxial post-like projection that also projects up from the bottom wall and has a cylindrical surface to which the pressure fluid port and the vent port open. The valving portion of the piston has an internal cylindrical surface which closely surrounds the post portion and which is of such axial extent that it just covers the two ports therein when the piston is in its normal position.

With that arrangement, the stroke of the piston is limited by the axial spacing between the pressure fluid port and the vent port, being, in theory, slightly less than three times the distance between them. The pressure fluid port must be spaced above the vent port by a distance such that both of those ports will just be covered by the valving portion of the piston when the piston is in its normal position. The vent port must be spaced above the bottom wall of the cylinder body by a distance slightly less than the axial length of the valving portion, so that the vent port will be covered by the valving portion of the piston however far below its normal position the piston may be. An upward travel of the piston must be so limited that the pressure fluid port is not uncovered when the piston is at the top of its stroke.

With that arrangement, the piston stroke can theoretically be made as long as desired. For increased stroke length, the vent port is raised farther above the bottom of the cylinder body, the distance between the pressure fluid port and the vent port is increased, and the effective axial length of the valving portion of the piston is correspondingly increased.

As a practical matter, however, the effective stroke length of the piston tends to be limited by the length of the cylinder body, because the whole device must fit in the relatively limited space between the seat proper and the chassis member on which it is mounted. Furthermore, the practical limit of piston travel is actually substantially less than three times the distance between the vent port and the pressure fluid port, because the valving portion of the piston cannot project very far above the top of the post-like portion of the cylinder body when the piston is at the top of its stroke. The reason for the last-mentioned limitation is that the valving portion, although constrained to move axially with the piston proper, must be free for limited radial motion relative to it in order to accommodate any lack of concentricity between the post-like portion and the rest of the cylinder body, and therefore if the valving portion is carried too far up the post-like portion, the valving portion, lacking guidance from the post-like portion, can tilt slightly and bind against it, preventing retraction of the piston. Increasing the height of the post-like portion, to afford more guidance to the valving portion, does not solve the problem because the top of the post-like portion will then engage the end wall of the piston and prevent the piston from retracting completely.

The preferred arrangement disclosed in the copending application also poses difficult manufacturing problems. The ports that open to the cylindrical surface of the post-like cylinder body portion must be communicated with the exterior of the cylinder body through passages which, in part, extend axially through that post-like portion. Since there must be two such passages in the post-like portion, one for each of the ports therein, those passages must be bored with some degree of precision. The longer they have to be, the more difficult and complicated it becomes to keep them straight and accurately located.

With these considerations in mind, the general object of this invention is to provide a hydraulic seat suspension cushioning and shock absorbing device generally like that disclosed in my above-identified copending application, but having a cylinder body that is relatively short in relation to the stroke length of the piston, and having other important advantages that include lower cost and longer useful life.

Another and very important object of this invention is to provide a hydraulic cushioning and shock absorbing device of the general type just described wherein there is a valving element which is separate from the piston, for controlling flow of pressure fluid into the interior of the cylinder and venting of fluid therefrom, and wherein said valving element travels through a stroke which is substantially shorter than that of the piston and in every part of its stroke is in contact all along its length with the post-like portion of the cylinder body.

Affording a stroke for the valving element that is substantially shorter than the piston stroke has very important consequences with respect to the satisfactory functioning of the device and its useful life. In order for the pressure fluid port and the vent port to be completely blocked when the piston is in its normal position, the inner surface of the valving element must obviously have a very close but slidable fit around the cylindrical surface to which those ports open. Although the hydraulic fluid that fills the interior of the cylinder body is a lubricant, wear between such closely fitting sliding surfaces is inevitable, and the greater the amount of relative travel between them, the greater will be the amount of wear. Thus, shortening the stroke of the valving element in relation to the piston stroke brings about a corresponding reduction of the potential for wear on the sealing surfaces.

Perhaps more important from the standpoint of reducing possible wear is that the valving element in the device of this invention never projects above the top of the post-like portion of the cylinder body and therefore, in every position, always receives full guidance from that post-like portion. By thus preventing tilting of the valving element relative to the post-like portion, the end portion of each of those parts is prevented from digging into the sealing surface on the other to score or abrade it.

It will now be apparent that the general object of the present invention is to provide an improved device which is generally like the one disclosed in my copending application but is substantially more compact in having a shorter overall length for a given piston stroke length, is smoother and more reliable in operation, is substantially more durable, and is nevertheless easier to manufacture and therefore lower in cost.

SUMMARY OF THE INVENTION

In general, the objects of the invention are attained with a device of the general character described, wherein the cylinder body has a bottom wall, a post-like portion that projects up from the bottom wall and has a cylindrical surface in which there are a vent port and a pressure fluid port spaced above the vent port, and an annular side wall projecting up from said bottom wall in radially spaced concentric relation to said post-like portion, said cylinder body having an accumulator port therein through which its interior is at all times communicable with an accumulator, and wherein a piston axially slidable in the cylinder body has an upper end wall and an annular wall which projects downwardly from said upper end wall and is closely slidably embraced by said annular side wall of the cylinder body, said device being characterized by: said annular wall of the piston being in radially spaced substantially concentric relation to the cylindrical surface of said post-like portion; said vent port being spaced above said bottom wall by a distance substantially less than the distance between the vent port and said pressure fluid port; an annular valving element having an inner cylindrical surface closely slidably embracing the cylindrical surface of said post-like portion and having an axial extent such as to cover and block both the pressure fluid port and the vent port when the valving element is in a normal position but to leave one of those ports uncovered when it is out of that normal position; and cooperating abutment means on the piston and on said valving element, said abutment means on the piston being near the bottom thereof, projecting radially inwardly, and providing an upwardly facing abutment surface, and said abutment means on the valving element being near the top thereof, projecting radially outwardly and providing a downwardly facing abutment surface, said cooperating abutment means enabling the piston to move downwardly relative to the valving element through a lower portion of the piston stroke but constraining the valving element to move with the piston through medial and upper portions of the piston stroke.

Preferably a coiled compression spring reacts between said upper end wall of the piston and said abutment means on the valving element, urging the piston and the valving element towards relative positions in which their respective abutment means are engaged.

BRIEF DESCRIPTION OF THE DRAWINGS

In the accompanying drawings, which illustrate preferred embodiments of the invention;

FIG. 3 is a view generally similar to FIG. 2 but on a smaller scale, showing the piston of the device in its lower range of positions;

FIG. 4 is a more or less diagrammatic side view of the seat installation under conditions corresponding to those illustrated in FIG. 3;

FIG. 5 is a view generally similar to FIG. 3 but showing the piston at a level just below its normal position;

FIG. 6 is a view generally like FIG. 4 but showing conditions corresponding to those of FIG. 5;

FIG. 7 is a view generally like FIG. 3 but showing the piston at the upper limit of its motion; and FIG. 8 is a view generally like FIG. 4 but showing conditions corresponding to those of FIG. 7.

DETAILED DESCRIPTION OF THE INVENTION

Figure 2:
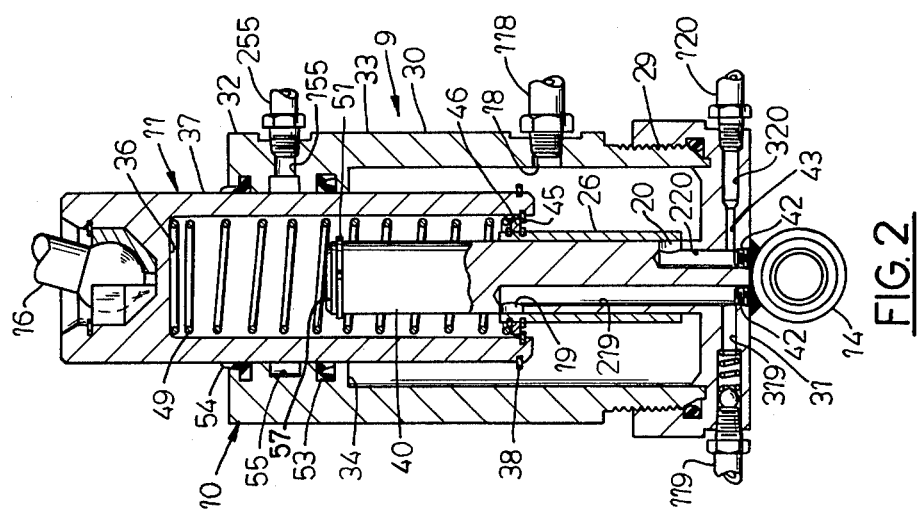
FIG. 2 is a view in vertical section of the cushioning device of this invention with the piston thereof in its normal position.
Figure 1:
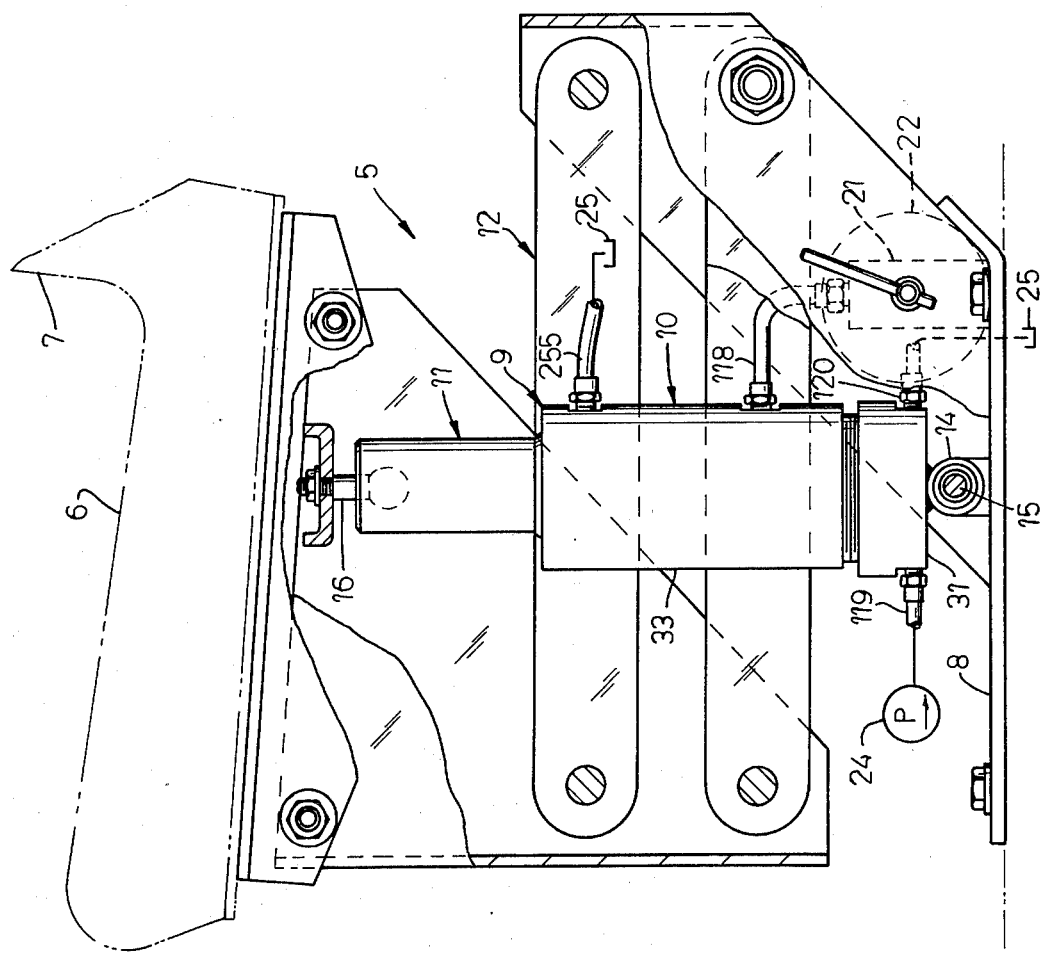
FIG. 1 is a view in side elevation, with portions shown broken away, of a seat installation comprising the resilient supporting and shock absorbing device of this invention.

Referring now to the accompanying drawings, the numeral 5 designates generally a seat to be occupied by the operator of an off-highway vehicle, having a generally horizontal seating member 6 and a more or less upright back rest 7. Interposed between the seating member 6 and a seat mounting chassis member 8 of a vehicle upon which the seat is carried is the resilient seat supporting and shock absorbing device of this invention, which is designated generally by 9 and which comprises a cylinder body 10 and a piston 11 that is slidable in the cylinder body. As shown, the cylinder body 10 is secured to the chassis member 8 while the seating member 6 is secured to the piston 11. This relationship could obviously be reversed but is preferred for convenience in making fluid connections to the device.

A generally conventional parallelogram linkage 12, such as is described in more detail in my above-identified copending application, is connected across the shock absorbing device 9, between the seating member 6 and the chassis member 8, to confine the seating member to up and down substantially translatory motion, and also to prevent it from rotating about the axis of the device 9.

As here shown, the device 9 has its axis substantially vertical, but it will be understood that it can be so connected with the seating member 6 and with the chassis member 8 that its axis extends obliquely upwardly. In any case, the arrangement of the parallelogram linkage 12 is such that up and down motion of the seat will have small components of rearward and forward motion which must be accommodated by the mounting for the device 9. The cylinder body 10 of the device is therefore formed with a bearing boss 14 at its underside in which there is a laterally extending swivel pin 15 that comprises a hinge connection with the chassis member 8; and the upper end portion of the piston 11, which projects a distance above the cylinder body 10, has an upwardly opening socket in which is received the spherical head of a swivel link 16 by which the piston is connected with the seating member 6.

The piston 11 serves to transmit forces between the seating member 6 and pressurized hydraulic fluid in the interior of the cylinder body 10, and the piston is at all times urged upward by such fluid. Fluid can flow into and out of the cylinder body through three ports in its interior, namely, an accumulator port 18, which is open at all times, and a pressure fluid inlet port 19 and a vent port 20, both of which are controlled by a valving element 26 so as to be open only at certain times.

By way of passages in the cylinder body 10 that are described hereinafter, the several ports 18, 19 and 20 in its interior are communicated with respective fittings 118, 119 and 120 on the exterior of the cylinder body. The accumulator port 18 is communicated, by means of the fitting 118 and by way of a manually adjustable throttling valve 21, with a hydraulic accumulator 22. The pressure fluid port 19 is connected by the fitting 119 with a source of fluid at substantially constant pressure, illustrated as a pump 24 that can energize hydraulic equipment of the vehicle by which the seat is carried. The vent port 20 is connected by means of the fitting 120 with a tank or reservoir 25 for unpressurized fluid.

The valving element 26 has a connection with the piston 11 whereby it so controls flow of fluid into and out of the cylinder body 10 through the ports 19 and 20 that fluid pressure always tends to maintain the piston in its normal position, in which it is illustrated in FIG. 2 and in which it is intermediate the upper and lower limits of its stroke. With the piston in that normal position, the valving element 26 blocks the ports 19 and 20 and fluid in the cylinder body 10 is under pressure developed only by the accumulator 22. The upward force imposed upon the piston 11 by accumulator fluid tends to counterbalance any load upon the seating member 6, but that force is a yielding one so that the piston can be resiliently displaced both upward and downward from its normal position. If the piston moves down from that position, the valving element 26 uncovers the pressure fluid port 19 to allow pressure fluid from the pump 24 to enter the cylinder body, and the consequently increased upward force upon the piston urges it back up to its normal position. Conversely, if the piston rises above its normal position, the valving element 26 uncovers the vent port 20, allowing fluid to escape from the cylinder body to the tank 25, and the consequent decrease in upward force upon the piston allows it to move back down to its normal position.

Because of the tendency of the piston 11 to maintain its normal position, regardless of load upon the seating member 6, the means for heightwise adjusting the seat can comprise a vertically adjustable connection between the seating member 6 and the piston 11, or else the mounting member 8 can be heightwise adjustable relative to the vehicle that carries it. The adjusting mechanism is not shown because its details will be obvious.

Turning now to a more detailed consideration of the device 9, its cylinder body 10 is generally cup-shaped, with an open top that is closed by the piston 11. The cylinder body can be made as two parts which can have a threaded connection with one another, as at 29, and which respectively comprise an annular side wall 30 and a bottom wall 31. The upper portion 32 of the side wall 30 has a smaller inside diameter than its lower portion 33, to have a close slidable fit around the piston 11 and to define a downwardly facing shoulder 34.

The piston is of inverted cup-shape and can be formed in one piece with an end wall 36 at its top that is rather thick to accommodate the socket for the swivel link 16. The annular side wall 37 of the piston, which projects down from its end wall 36, has a cylindrical outer surface with a diameter somewhat smaller than the inside diameter of the lower portion 33 of the cylinder body side wall. Near its bottom the piston has a radially outwardly projecting circumferential land 38, preferably formed by a spring clip ring engaged in a circumferential outwardly opening groove in the piston body, to provide an upwardly facing abutment that defines the upper limit of the piston stroke by engaging the downwardly facing circumferential shoulder 34 in the cylinder body.

Since the piston 11 is radially spaced from all of the lower portion 33 of the cylinder body side wall, the accumulator port 18 can open to the interior surface of that side wall portion at any desired location and can thus be communicated with the accumulator fitting 118 by means of a short radial bore through that side wall.

The pressure fluid port 19 and the vent port 20 are formed in a concentric post-like portion 40 of the cylinder body that projects up from its bottom wall 31 to a level near that of the shoulder 34. The diameter of this post-like portion, which is uniform along most of its length, is substantially smaller than the inside diameter of the annular side wall 37 of the piston. The pressure fluid port 19 and the vent port 20 open to its cylindrical side surface, which is closely slideably embraced by the annular valving element 26. The pressure fluid port 19 is spaced above the vent port 20 by a distance such that the valving element 26 just covers both of those ports when it is in its normal position, in which it is shown in FIG. 2, whereas the vent port 20 is spaced by a substantially smaller distance above the bottom wall 31 of the cylinder body.

The passages in the cylinder body 10 that communicate the pressure fluid port 19 and the vent port 20 with the pressure fluid fitting 119 and the outlet tank fitting 120, respectively, are defined by bores 219 and 220 which are drilled up from the bottom of the cylinder body and axially through the post-like portion 40 to the respective ports, and communicating bores 319 and 320, respectively, which are drilled radially into the bottom wall 31 of the cylinder body. The lower ends of the vertical bores 219 and 220, below their junctions with the respective radial bores 319 and 320, are suitably plugged as at 42. The radial bore 320 has a reduced diameter portion that provides a fixed flow restriction 43 for throttling outflow of vented fluid from the cylinder body. Note that the axial bore 220 is short because of the location of the vent port 20 near the bottom wall 31, and that the bore 219, for the same reason, is not unduly long.

The connection between the valving element 26 and the piston 11 is one that provides for a substantial amount of relative axial motion between them but nevertheless constrains the valving element to move up and down from its normal (FIG. 2) position in coordination with up and down movement of the piston from its normal position. That connection comprises a circumferential land or ridge 45 on the piston, near its bottom, projecting radially inwardly from its inner surface and defining an upwardly facing shoulder, and an axially opposing circumferential land or ridge 46 on the valving element, near the top thereof, providing a downwardly facing abutment.

The land 45 on the piston can be defined by a circular radially expansible spring clip received in an inwardly opening circumferential groove in the side wall 37 of the piston. The land 46 on the valving element is shown as a ring which closely embraces the valving element and which is axially confined between a pair of circular spring clips, each received in a radially outwardly opening groove in the cylindrical exterior surface of the valving element.

When the piston 11 is in its normal position shown in FIG. 2, the circumferential lands 45 and 46 tend to remain engaged by reason of the upward fluid pressure force acting upon the piston and the downward force of gravity acting upon the valving element 26, but it is preferred that they be biased towards engagement in a more positive manner, and to that end there is a coiled compression spring 49 housed within the piston 11 and reacting between its upper end wall and the upper surface of the land 46 on the valving element.

When the piston 11 is at its normal position, or anywhere above its normal position, the lands 45 and 46 are engaged, and therefore, in those portions of the piston stroke, the valving element 26 moves in unison with the piston. Note that even when the piston 11 is at the upper limit of its stroke, as illustrated in FIG. 7, the valving element is engaged all along its length with the post-like portion 40 of the cylinder body and therefore is not free to tilt. Furthermore, the post-like portion can have an enlargement 51 at its upper end to define an abutment which can be engaged by the valving element 26 at the upper limit of the piston stroke and which cooperates with the shoulder 34 in the cylinder body to define the upper limit of piston motion. Any time the valving element is above its normal position—even when it is at the upper limit of its travel—it leaves the vent port 20 uncovered but covers the pressure fluid port 19.

As the piston 11 moves down from its normal position, the valving element 26 at first descends in unison with it, as illustrated in FIG. 5, because the lands 45 and 46 remain engaged under the bias of the spring 49. With continued downward movement of the piston, however, a point is reached at which the pressure fluid port 19 is completely uncovered, the vent port 20 is completely covered by the valving element 26, and the valving element rests on the bottom wall 31 of the cylinder body. The valving element of course cannot continue its downward motion beyond that point, but the piston 11 can continue its descent through a substantial distance as the lands 45 and 46 disengage from one another and the spring 49 is increasingly compressed. The bottom limit of the piston stroke is reached when the end wall 36 of the piston engages the top of the post-like portion 40 of the cylinder body, which is preferably provided with a resilient bumper 57. At that point, the bottom edge of the annular piston side wall 37 is spaced a small distance above the bottom wall 31 of the cylinder body.

As the piston rises from at or near the bottom of its stroke, the valving element 26, under the bias of the spring 49, is maintained in the bottomed position in which it is shown in FIG. 3, until the ascending piston brings the lands 45 and 46 back into engagement with one another, and from that point the valving element moves upwardly in unison with the piston.

The interior of the piston, above its land 45, should have free communication with the rest of the cylinder body interior, even when the lands 45 and 46 are engaged, so that the pressure of fluid acting upon the end wall 36 of the piston will be substantially equal to pressure of fluid elsewhere in the interior of the cylinder body. To that end, the lands 45 and 46 can have circumferential discontinuities, or passages through or around them can be provided in some other suitable manner.

In the upper portion of the cylinder body there are axially spaced resilient annular seals 53 and 54, seated in inwardly opening circumferential grooves, which closely surround the piston to wipe dirt off of it as it descends and wipe hydraulic fluid off of it as it rises. Between the seals the cylinder body has a radially inwardly opening groove 55 for collection of hydraulic fluid that passes the inner annular seal 53, and that groove 55 is communicated with the tank 25 through a bore 155 in the cylinder body and an external fitting 255, to permit return to the hydraulic system of leakage fluid collected in the groove.

It is not necessary that there be fluid in the cylinder body of the device 9 nor in the accumulator 22 when those units are installed and connected. When installation is completed and all fluid connections are made, it is merely necessary to supply fluid at suitable pressure to the pressure fluid port 19, and this will automatically effect charging of the accumulator 22, filling of the interior of the cylinder body with fluid, and movement of the piston 11 and the valving element 26 to their normal positions. Any air that may be entrapped in the upper portion of the inverted cup-shaped piston will not affect operation of the device. In the course of use, such air will be dissolved in the hydraulic fluid and carried away, due to pressure in the interior of the cylinder body and more or less continuous movement of fluid into and out of the cylinder body.

From the foregoing description and the accompanying drawings it will be seen that the present invention provides a simple, compact and inexpensive device that provides both for resilient support of a vehicle seat and for damping of its up and down motion, wherein the piston always tends to maintain a predetermined position relative to the cylinder body, regardless of changes in load on the seat, and wherein the piston can have a substantially long stroke in relation to the length of the cylinder body.

Those skilled in the art will appreciate that the invention can be embodied in forms other than as herein disclosed for purposes of illustration.

The invention is defined by the following claims:

I claim:

1. A device for connection between a vehicle chassis member and a seating member to provide for support of the seating member in a manner to cushion relative upward and downward motion between said members, said device being of the type comprising a cylinder body for connection to one of said members and a piston for connection to the other of said members, said piston being coaxially slideable in the cylinder body upwardly and downwardly from a normal position, said device being characterized by:
   A. said cylinder body comprising
      (1) a bottom wall,
      (2) an annular side wall which projects up from said bottom wall, and
      (3) a concentric post-like portion projecting up from said bottom wall and having a cylindrical surface;
   B. the piston comprising
      (1) a top wall and
      (2) an annular side wall which has slideable sealing engagement with the side wall of the cylinder body and which surrounds said post-like portion in radially spaced relation to its cylindrical surface;
   C. said cylinder body having
      (1) an accumulator port opening to its interior, for connection with a fluid accumulator which tends to maintain pressure fluid in the interior of the cylinder body whereby a yielding upward force is imposed upon the piston,
      (2) a vent port opening to said cylindrical surface, spaced above said bottom wall, through which fluid can be vented out of the cylinder body, and
      (3) a pressure fluid port opening to said cylindrical surface, spaced above said vent port, for connection with a source of fluid under substantially constant pressure;
   D. an annular valving element surrounding said post-like portion and having a radially inner valving surface which closely opposes said cylindrical surface and cooperates therewith for covering and blocking said pressure fluid port and said vent port, said valving element being of such axial extent that both of those ports are blocked by it only when the valving element is in a normal position from which it can move up and down; and
   E. motion transmitting means providing a connection between the piston and the valving element that permits relative axial motion between them but whereby movement of the piston in each direction from its normal position compels movement of the valving element in the same direction out of its normal position, said motion transmitting means comprising a spring connected between the piston and the valving element.

2. The device of claim 1, further characterized by: said spring being a coiled compression spring reacting between the underside of said top wall of the piston and a radially outwardly projecting shoulder on the valving element.

3. The device of claim 1, wherein said motion transmitting means further comprises:
   (1) means on the valving element defining a radially outwardly projecting downwardly facing abutment, and
   (2) means on said annular side wall of the piston defining a radially inwardly projecting upwardly facing abutment that is engaged with the downwardly facing abutment on the valving element when the piston is at and above its normal position but is spaced therebeneath when the piston is substantially below its normal position.

4. A device for connection between a vehicle chassis member and a seating member to provide for cushioning support of said seating member, said device being of the type comprising a cylinder body connectable to one of said members and having a bottom wall, a post-like portion that projects up from said bottom wall and has a cylindrical surface in which there are a vent port through which fluid can leave the cylinder body and a pressure fluid port which is spaced above the vent port and which is connectable with a source of fluid under substantially constant pressure, said cylinder body also having an annular side wall projecting up from its bottom wall in radially spaced concentric relation to said post-like portion and further having an accumulator port through which its interior is at all times communicable with an accumulator, said device further comprising a piston axially slideable in the cylinder body and connectable to the other of said members, said piston having an upper end wall and an annular wall which projects downwardly from said upper end wall and is closely slidably embraced by said annular side wall of the cylinder body, said device being characterized by:
   A. said annular wall of the piston being in radially spaced substantially concentric relation to the cylindrical surface of said post-like portion;
   B. said vent port being spaced above said bottom wall by a distance substantially less than the distance between the vent port and said pressure fluid port;
   C. an annular valving element having an inner cylindrical surface closely slidably embracing the cylindrical surface of said post-like portion and having an axial extent such as to cover and block both the pressure fluid port and the vent port when the valving element is in a normal position but to leave one of those ports uncovered when it is out of its said normal position; and
D. cooperating abutment means on the piston and on said valving element,
  (1) said abutment means on the piston being near the bottom thereof, projecting radially inwardly, and providing an upwardly facing abutment surface, and
  (2) said abutment means on the valving element being near the top thereof, projecting radially outwardly, and providing a downwardly facing abutment surface, whereby the piston is free to move downwardly relative to the valving element through a lower portion of the piston stroke but the valving element is constrained to move with the piston through medial and upper portions of the piston stroke.

5. The device of claim 4, further characterized by:
E. a coiled compression spring reacting between said upper end wall of the piston and said abutment means on the valving element, urging the piston and the valving element towards relative positions in which their respective abutment means are engaged.

* * * * *